April 8, 1958 R. W. CLARK 2,830,207

MAGNETIC TRACK

Filed Jan. 3, 1955 2 Sheets-Sheet 1

INVENTOR.
R. W. Clark
BY Bailey, Stephens & Huettig
Attys.

April 8, 1958 R. W. CLARK 2,830,207

MAGNETIC TRACK

Filed Jan. 3, 1955 2 Sheets-Sheet 2

INVENTOR.
R.W. Clark
BY Bailey, Stephens & Huettig
Attys.

2,830,207
Patented Apr. 8, 1958

2,830,207

MAGNETIC TRACK

Robert W. Clark, St. Paul, Minn., assignor, by mesne assignments, to Librascope, Incorporated, a corporation of California Application January 3, 1955, Serial No. 479,399

4 Claims. (Cl. 310—154)

This invention relates to a magnetic track usable in connection with analog digital converters.

In these converters cylindrical magnetic tracks are used for the purpose of storing binary digital information, which is read out by means of a magnetic pickup head. Ordinarily a plurality of magnetic ring tracks are assembled into a cylinder or drum. The tracks are formed of individual magnets which have heretofore been separated from each other by insulating blocks. This has necessitated the construction of rings of relatively large diameter, inasmuch as each ring may contain as many as several hundred individual magnets.

An object of the instant invention is to construct a ring having a track of individual magnets which is very compact. A further object of the invention is to construct a magnetic track from which signals for a 0 or a 1 may be read out with good discrimination between the two types of signals.

In general, these objects are obtained by constructing a track of individual magnets in contact with each other with their poles so arranged that alternate magnets are effective as spacer or barrier magnets acting in the sense of the insulating blocks heretofore used. Alternate magnets so arranged are 180° out of phase, with respect to each other, and the spacer magnets, coupled with the intervening magnets, produce strong flux fields so that clear signals can be read out from the track. In addition, the poling of the magnets is such that a 1 is read out in one direction of magnetization, and a 0 is read out in an opposite direction of magnetization, so that a good discrimination exists between the two types of signals.

The means by which the objects of the invention are obtained are described more fully with reference to the accompanying drawings, in which.

Figure 3:
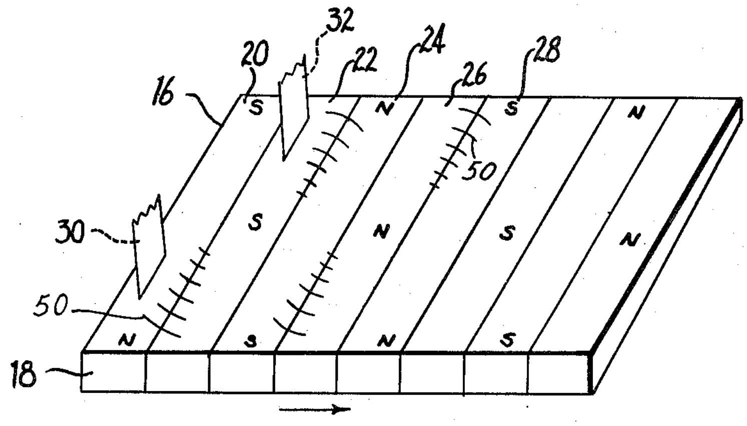
Figure 3 is an enlarged isometric view showing the order of arrangement of the magnets in a track.
Figure 3A:
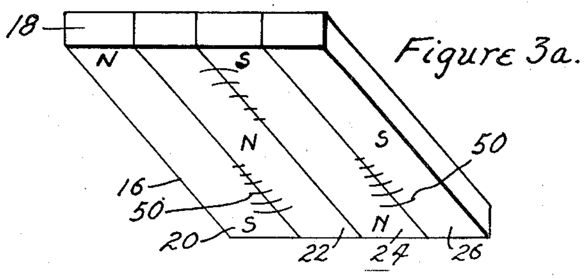
Figures 4, 6:
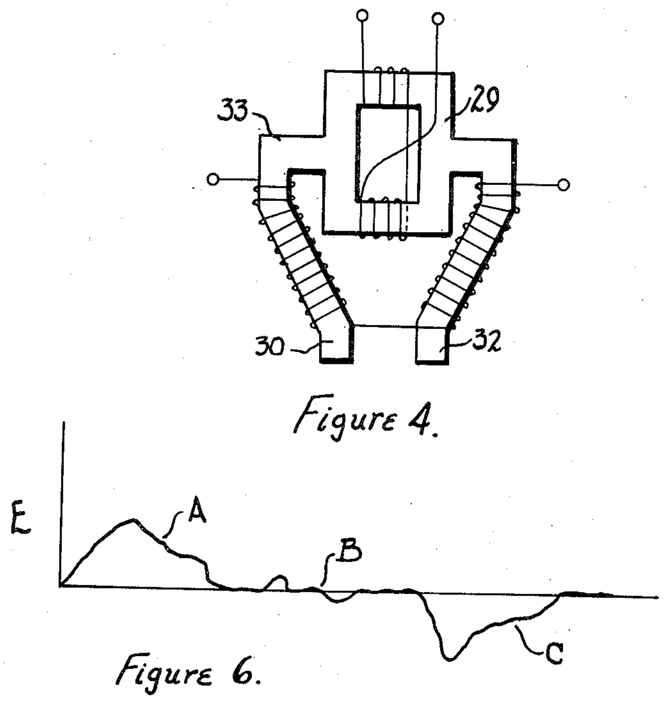
Figure 5:
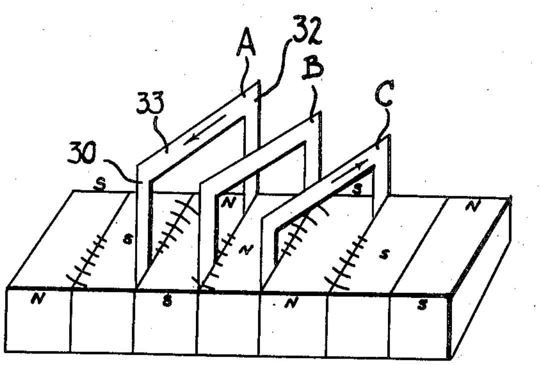

Figure 3*a* is an enlarged perspective view showing the construction of various magnets forming a part of the embodiment shown in Figure 3 as seen from the faces of the magnets opposite to those shown in Figure 3;

Figure 4 is a front elevational view of a type of a pickup head;

Figure 5 is a view similar to Figure 3, but showing the pickup head in three different positions; and Figure 6 is a graph illustrating the discrimination obtained between the signals produced from the track.

Figure 1:
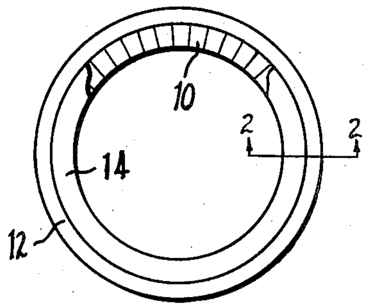
Figure 1 is a side elevational view of a magnetic track ring with a portion broken away to show the individual magnets.
Figure 2:
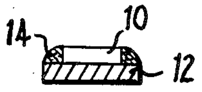
Figure 2 is a cross-sectional view on line 2—2 of Figure 1.

In Figure 1 the individual magnets 10, which are in the form of rectangular bars, are assembled side by side in contact with each other on the inner surface of ring 12, and held in place, for example, by means of potting compound 14.

The order of the arrangement of the magnets is shown in Figure 3. Magnet 16 has one end 18 poled north, and its opposite end 20 poled south. The next magnet 22 is a spacer magnet and has its upper half, or upper face, poled south while its opposite face is poled north. Magnet 24 has its ends poled south and north, respectively, but positioned opposite to the poling of magnet 16. Magnet 26 is similar to spacer magnet 22 with the exception that it is arranged with its north pole faced uppermost. The remaining magnets in the track are arranged in the same repeated order. It is thus shown that alternate magnets having their ends or faces poled north and south are 180° out of phase with each other. Broad flux fields are formed in the path of the pickup head between adjoining north-south polings. For example, between magnets 20 and 24 the flux of the south pole of magnet 20 is augmented by the flux of the south face of magnet 22 to produce a strong south pole concentration of this point. At the same time the north end of magnet 24 is augmented by the north face of magnet 26. Therefore, the use of the spacer or barrier magnets 22 and 26 will produce a broad flux field on the line between magnets 22 and 24 at the south end of the latter. It is further noted that a similar broad flux field will appear on a line between magnets 24 and 26 at the north end of magnet 24, but in an opposite sense. A like broad flux field will appear between magnets 26 and 28 at the south end of magnet 28. On the other hand, where north and south poles are adjacent each other as at the north end 18 of magnet 16 and south face of magnet 22, their attraction causes a strong flux field in the magnets themselves. As the energy is thus absorbed in the magnets, there is no force available for the pickup head. At this point the track is said to be short-circuited with respect to the pickup head.

The effective short-circuiting of the magnets is indicated by curving lines 50 in Figures 3 and 3*a*. The degree of short-circuiting is indicated by the length of the lines 50. As will be seen, the degree of short-circuiting of adjacent magnets increases with progressive movements toward the ends of the magnets. The reason is that alternate magnets such as the magnets 16 and 24 have optimum pole strengths at the ends of the magnets. Because of this, the magnets 16 and 24 respectively provide an increasing neutralization relative to the strengths of the magnets 22 and 26 with increasing movements toward the ends of the magnets.

In Figure 4 a typical magnetic pickup head 29 is shown. As indicated in Figure 3, the pickup fingers 30 and 32 are offset so that they will magnetically contact adjacent magnets.

Fingers 30 and 32 are connected by yoke 33, and the head is composed of magnetic material of low coercive force.

Figures 5 and 6 illustrate the extraction of signals from the track. In position A the fingers 30 and 32 are above the centers of the broad north and south pole fields on opposite sides of the track. A flux is produced in yoke 33 in the direction indicated by the arrow, and an output 1 is obtained as shown by the typical oscilloscope curve of Figure 6. At position B the fingers are above the short-circuited portions of the track, and no flux change occurs in yoke 33, and there is no output. In position C, the fingers are again over the centers of the broad flux field, and a flux change occurs in yoke 33 which is opposite that of position A, as shown by the arrow, and by the oscilloscope curve. Thus this output is deemed a 0. Consequently, the discrimination between a 1 and a 0 extends over the combined amplitudes of the same, rather than over the amplitude of one alone.

It will be seen from the above discussion that the apparatus shown in Figures 3 and 3*a* may be used as a clock generator as well as in an analog-to-digital converter. The apparatus shown in Figures 3 and 3*a* may be used as a clock generator when the apparatus is included as one of the tracks in a drum. As indicated by the arrow at the bottom of Figure 3, the drum may be rotatable with respect to the pick-up head 29 formed in part by the legs 30 and 32. As the drum rotates, adjacent magnets move past the pick-up head 29 to induce signals of alternate polarity in the head. This may be seen from a comparison of signals A and C in Figure 6 and from the previous discussion as to how the signals are produced. As is well known, a clock generator has primary utility in digital computers and data processing systems.

By thus arranging alternate magnets with their ends poled 180° out of phase, and spaced by alternate magnets having their faces poled 180° out of phase, the need for insulating blocks is eliminated and smaller magnets can be used to reduce the diameter of a cylindrical track.

Having now described the means by which the objects of the invention are obtained, I claim:

1. Apparatus for providing magnetic information including a track having discriminable magnetic areas occurring in a sequence therealong; said sequence including facewise poled magnetic areas disposed between endwise poled magnetic areas; each facewise poled magnetic area being 180° out of phase with the adjacent facewise poled areas; and each endwise poled magnetic area being 180° out of phase with the adjacent endwise poled magnetic areas.

2. Apparatus as set forth in claim 1 and including a pickup head having a pair of legs disposed in contiguous and skewed relationship to the magnetic areas to provide a magnetic association between one of the legs and a particular endwise poled magnetic area at one end of the area and a simultaneous magnetic association between the other leg and a particular facewise poled magnetic area at the opposite end of the area, the particular endwise and facewise magnetic areas being adjacent.

3. In combination, a first plurality of magnets having a pair of faces and having opposite poles disposed at the ends of the faces, a second plurality of magnets having a pair of faces and having opposite poles disposed on the faces, the magnets in the first plurality being disposed in alternate relationship with the magnets in the second plurality, each of the magnets in the first plurality being disposed with its poles in opposed relationship to the next magnets in the plurality, each of the magnets in the second plurality being disposed with its poles in opposed relationship to the next magnets in the plurality, and at least one pick-up head having a pair of legs joined by a body portion and having one of the legs disposed in contiguous relationship to one of the magnets in the first plurality at one end of the magnet and having the other leg disposed in contiguous relationship to the adjacent magnet in the second plurality at the opposite end of the magnet.

4. In combination, a first plurality of magnets having a pair of ends defining the boundaries of the magnets, a second plurality of magnets having a pair of opposite faces and having a pair of ends defining the boundaries of the magnets, the magnets in the first plurality having poles at the opposite ends of the magnets, the magnets in the second plurality having poles at the opposite faces of the magnets, the magnets in the first polarity being disposed in alternate relationship with the magnets in the second plurality, each magnet in the first plurality being disposed 180° out of phase with the next magnet in the plurality, each magnet in the second plurality being disposed 180° out of phase with the next magnet in the plurality, at least one pick-up head having a pair of legs and a body portion joining the legs, the pick-up head being disposed in skewed and contiguous relationship to the magnets to provide a magnetic coupling between one of the legs in the pick-up heads and one of the magnets in the first plurality at one end of the magnet and a magnetic association between the other leg in the pick-up head and the adjacent magnet in the second plurality at the opposite end of the magnet.

No references cited.